United States Patent
Joergensen

(10) Patent No.: US 10,257,909 B2
(45) Date of Patent: Apr. 9, 2019

(54) MULTISOURCE ILLUMINATION DEVICE WITH VARIABLE F-NUMBER

(71) Applicant: Martin Professional ApS, Aarhus (DK)

(72) Inventor: Dennis Thykjaer Joergensen, Roende (DK)

(73) Assignee: MARTIN PROFESSIONAL APS, Aarhus (DK)

(*) Notice: Subject to any disclaimer, the term of this patent is extended or adjusted under 35 U.S.C. 154(b) by 0 days.

(21) Appl. No.: 15/940,691

(22) Filed: Mar. 29, 2018

(65) Prior Publication Data
US 2018/0310383 A1  Oct. 25, 2018

(30) Foreign Application Priority Data
Apr. 19, 2017 (EP) .................................... 17167067

(51) Int. Cl.
| | | |
|---|---|---|
| F21S 10/00 | (2006.01) | |
| G02B 19/00 | (2006.01) | |
| H05B 37/02 | (2006.01) | |
| F21V 5/00 | (2018.01) | |
| H04N 9/00 | (2006.01) | |
| H05B 33/08 | (2006.01) | |
| F21W 131/406 | (2006.01) | |
| F21Y 115/10 | (2016.01) | |
| F21Y 105/18 | (2016.01) | |

(52) U.S. Cl.
CPC ............. *H05B 37/02* (2013.01); *F21V 5/007* (2013.01); *H04N 9/00* (2013.01); *H05B 33/08* (2013.01); *F21W 2131/406* (2013.01); *F21Y 2105/18* (2016.08); *F21Y 2115/10* (2016.08)

(58) Field of Classification Search
None
See application file for complete search history.

(56) References Cited

U.S. PATENT DOCUMENTS

| | | |
|---|---|---|
| 2007/0046898 A1 | 3/2007 | Conner |
| 2016/0069540 A1* | 3/2016 | Kjeldsen .................. F21S 10/00 362/232 |

FOREIGN PATENT DOCUMENTS

EP    2995852 A1    3/2016

* cited by examiner

*Primary Examiner* — Dedei K Hammond
(74) *Attorney, Agent, or Firm* — Brooks Kushman P.C.

(57) ABSTRACT

A method for controlling a multisource illumination device in gated optical system is provided. A plurality of light sources is divided into groups, and wherein each group is characterized by a respective radial distance from a primary optical axis. Therein, the dimming level of a group is controlled independently from the dimming level of other groups based on the radial distance of the group from the primary optical axis.

20 Claims, 8 Drawing Sheets

MULTISOURCE ILLUMINATION DEVICE WITH VARIABLE F-NUMBER

CROSS-REFERENCE TO RELATED APPLICATIONS

This application claims foreign priority benefits under 35 U.S.C. § 119(a)-(d) to EP Application Serial No. 17167067.2 filed Apr. 19, 2017, the disclosure of which is hereby incorporated in its entirety by reference herein.

TECHNICAL FIELD

The present invention relates to a method for a multisource illumination device, and in particular relates to a method for a multisource illumination device in a gated light system.

BACKGROUND

In order to create various light effects and mood lighting in connection with concerts, live shows, TV shows, sport events, or as part of architectural installations, light fixtures creating various light effects are getting more and more appreciated in the entertainment industry. Typically, entertainment light fixtures create a light beam having a beam width and a divergence and can for instance be wash/flood light fixtures creating a relatively wide light beam or projecting fixtures configured to project images onto a target surface.

Projecting light fixtures typically comprise one or more optical gates illuminated by an illumination device, and an optical projecting system is configured to collect light passing through the optical gate along a primary optical axis. A beam-shaping object is often arranged at the optical gate, or near the optical gate, and is used to shape the light beam. The optical gate can be delimited by an aperture, however it is to be understood that a physical aperture can be omitted and that the beam shaping device also can constitute an aperture. The beam shaping object can be used to create midair effects (visible due to light scattering in/on smoke/haze in the air) where the shape of the light beam in midair is defined by the beam shaping object and/or the beam shaping object can create a light pattern which is projected to and imaged on a target surface. The beam shaping object can be any object capable of modifying the light beam and can, for instance, be static or dynamic GOBOs, animation wheels, frost filters, color filters, prisms, framing blades, iris, textured glass or other aspects known in the art of light design. The beam shaping objects can be used as static objects arranged in the light beam and/or as movable objects which are moved in relation to the light beam in order to create a dynamic light effect. Additionally, it is known to use digital imaging devices such as dot-matrix-displays (DMDs), Liquid Crystal Displays (LCDs) or the like as beam shaping objects whereby the projected light beam can be used in a digital projector, for instance, in order to project graphical images and/video signals onto a screen.

Light designers and programmers want as many effects as possible in a lighting apparatus, as this gives the light designer and programmers many options when creating light shows. However, it is difficult to provide lighting apparatus with many effects as each kind of light effect components take up space in the lighting apparatus. Especially, it is difficult to provide many beam shaping objects in projecting light devices as the beam shaping objects need to be positioned in a focal point (the optical gate) of the optical system, and typical optical systems are only capable of focusing in a very limited area. At the same time, it is also desired to have light and compact light fixtures which are easier and more variably to handle. Additionally, light designers and programmers also want new light effects which can be used to create light shows.

Therefore, the need exists for an improved method for operating an illumination device, and an improved illumination device, capable of creating a high number of new light effects, which can be variably and independently controlled.

SUMMARY

This need is met by the subject matter of the independent claims. Further advantageous features are subject matter of the dependent claims.

According to a first aspect of the invention, a method for controlling a multisource illumination device is provided, wherein the multisource illumination device comprises a plurality of light sources. Each light source generates a source light beam propagating at least partially along a primary optical axis of the multisource illumination device. The plurality of light sources is divided into a plurality of groups of light sources based on a radial distance of each light source from the primary optical axis, wherein each group of light sources is located at a respective radial distance from the primary optical axis, and wherein the radial distance of each group is different from the radial distances of the other groups. The radial distance of each group of light sources from the primary optical axis can represent a radial distance range of each group of light sources, in which all light sources of the group are located. The radial distance range of a group of light sources can be defined by two different values of a radial distance and all radial distances in between the two values. Each light source has a distance from the primary optical axis defined as the shortest distance from a center of the respective light source to the primary optical axis. All light sources in one specific group of light sources have a radial distance that lies within the radial distance range of the specific group of light sources.

The method comprises controlling a dimming level of each group of light sources independently from the dimming level of the other groups of light sources. A dimming level of a group of light sources can be defined as the ratio of the actual light output of a group of light sources relative to the maximum light output of the group of light sources, wherein the dimming level varies between 3 or more values between 0% and 100%, or varies gradually between 0% and 100%. The dimming level of each group is controlled in such a way that all light sources of one group have the same light output, wherein the light output is at least partly directed towards an optical gate.

Therein, a dimming level of a group of light sources is correlated to the radial distance of the group of light sources from the primary optical axis. Controlling the dimming level can comprise that a change of the dimming level of a group of light sources is correlated to the radial distance of the group from the primary optical axis.

That the dimming level of a group is controlled based on the radial distance of the group from the primary optical axis has the effect that focus depth and overall light output of the multisource illumination device can be variably controlled independently of each other in wide ranges of the dimming level, thereby enabling a high number of new light effects and increasing the electro-optical efficiency of the illumination device. At the same time, a multisource illumination device can be built in a compact and space-saving form.

The dimming level of each group of light sources can be controlled in such a way that the dimming level of each group of light sources is correlated to the radial distance of the corresponding group of light sources from the primary optical axis.

That the dimming level of each group is controlled based on the radial distance of the corresponding group from the primary optical axis further enhances the effect that focus depth and overall light output of the multisource illumination device can be variably controlled independently of each other in wide ranges of the dimming level, thereby enabling an even higher number of new light effects.

The dimming level can be decreased in dependence on the radial distance of the corresponding group of light sources, wherein the decrease of the dimming level is larger the further away the corresponding group of light sources is located from the primary optical axis.

That the dimming level is decreased in dependence on the radial distance of the corresponding group of light sources, wherein the decrease of the dimming level is larger the further away the corresponding group of light sources is located from the primary optical axis enables the new light effect, that the overall light output of the multisource illumination device can be variably decreased wherein at the same time the focus depth can be variably increased in wide ranges of the dimming level, provided that at least two groups of light sources are operated. This furthermore has the effect that the optical efficiency, and thereby the overall electro-optical efficiency, of the multisource illumination device is increased, as the inner groups of light sources have a higher optical efficiency than outer groups of light sources.

The dimming level can be decreased in dependence on the radial distance of the group of light sources, wherein the decrease of the dimming level is larger the closer the corresponding group of light sources is located to the primary optical axis.

That the dimming level is decreased in dependence on the radial distance of the group of light sources, wherein the decrease of the dimming level is larger the closer the corresponding group of light sources is located to the primary optical axis enables the new light effect that the overall light output of the multisource illumination device can be variably decreased wherein at the same time the focus depth can be variably decreased in wide ranges of the dimming level, provided that at least two groups of light sources are operated.

The dimming level can be increased in dependence on the radial distance of the group of light sources, wherein the increase of the dimming level is larger the closer the corresponding group is located to the primary optical axis.

That the dimming level is increased in dependence on the radial distance of the group of light sources, wherein the increase of the dimming level is larger the closer the corresponding group is located to the primary optical axis enables the new light effect that the overall light output of the multisource illumination device can be variably increased wherein at the same time the focus depth can be variably decreased in wide ranges of the dimming level, provided that at least two groups of light sources are operated. Furthermore, the optical efficiency and thereby the overall electro-optical efficiency, of the multisource illumination device is thereby improved, as the inner groups of light sources have a higher optical efficiency than outer groups of light sources.

The dimming level can be increased in dependence on the radial distance of the group of light sources, wherein the increase of the dimming level is larger the further away the corresponding group is located from the primary optical axis.

That the dimming level is increased in dependence on the radial distance of the group of light sources, wherein the increase of the dimming level is larger the further away the corresponding group is located from the primary optical axis enables the new light effect that the overall light output of the multisource illumination device can be variably increased wherein at the same time the focus depth can be variably increased in wide ranges of the dimming level, provided that at least two groups of light sources are operated.

The dimming level of each group can be decreased to substantially 0% before the dimming level of a next group of light sources is decreased. A next group of lights sources is a group of light sources with a smaller or larger radial distance than that of a current group of light sources, wherein the next group of light sources can be directly adjacent to the current group of light sources.

That the dimming level of each group is decreased to substantially 0% before the light the next group of light sources is decreased, further enhances new light effects and the electro-optical efficiency of the multisource illumination device.

The dimming level of each group can be increased to substantially 100% before the dimming level of a next group of light sources is increased.

That the dimming level of each group is increased to substantially 100% before the dimming level of a next group of light sources is increased further enhances new light effect and the electro-optical efficiency of the multisource illumination device.

The dimming level of each group can be controlled in such a way, that the focus depth of the multisource illumination device remains the same and the overall light output of all groups of light sources is changed, by changing the dimming level in dependence on the radial distance to the primary optical axis. Changing the dimming level can comprise maintaining the dimming relationship between different groups of light source, while changing the overall dimming level of the multisource illumination device.

That the focus depth of the multi source illumination device remains the same and the overall light output of all groups of light sources is changed enables further new light effects, wherein the sharpness of an image on a target surface is stable, or a beam shaping characteristic is stable, while dimming the brightness of the illumination device.

The dimming level of each group can be controlled in such a way, that the overall light output of the groups of light sources remains the same and the focus depth of the multisource illumination device is changed, by changing the dimming level in dependence on the radial distance to the primary optical axis. Changing the focus depth of the multisource illumination device can comprise changing the dimming relationship between different groups of light sources, while keeping the overall dimming level of the multisource illumination device constant.

That the overall light output of the groups of light sources remains the same and the focus depth the multisource illumination device is changed enables further new light effects, wherein the sharpness of an image projected onto a target surface is changed, or a beam shaping characteristic is changed, while keeping the light output level of the illumination device constant.

The dimming level of each group can be controlled in such a way, that the overall light output of the groups of light sources is changed and at the same time the focus depth of the multisource illumination device is changed, by changing the dimming level in dependence on the radial distance to the primary optical axis. Changing the overall light output of the groups of light sources and the focus depth of the multisource illumination device at the same time can comprise changing the dimming relationship between different groups of light sources, while also changing the overall dimming level of the multisource illumination device.

That the overall light output of the groups of light sources is changed and at the same time the focus depth the multisource illumination device is changed enables a plurality of new light effects, wherein the sharpness of an image projected onto a target surface, or beam shaping characteristics, as well as the light output level of the illumination device can be changed variably and independently at the same time.

According to another aspect of the invention, a multisource illumination device is provided, wherein the multisource illumination device comprises a plurality of light sources, and wherein each light source generates a source light beam propagating at least partially along a primary optical axis of the multisource illumination device. Therein, the plurality of light sources are divided into a plurality of groups based on a radial distance of each light source from the primary optical axis, each group is located at a respective radial distance from the primary optical axis, and the radial distance of each group is different from the radial distances of the other groups.

The radial distance of each group of light sources from the primary optical axis can represent a radial distance range of each group of light sources, in which all light sources of the group are located. The radial distance range of a group of light sources can be defined by two different values of a radial distance and all radial distances in between the two values. Each light source has a distance from the primary optical axis defined as the shortest distance from a center of the respective light source to the primary optical axis. All light sources in one specific group of light sources have a radial distance that lies within the radial distance range of the specific group of light sources.

The multisource illumination device further comprises a controller configured to control the dimming level of each group independently from the dimming levels of the other groups and to control the dimming level of each group in such a way, that all light sources of one group have the same light output. The multisource illumination device further comprises at least one optical gate. Therein, the controller is configured in such a way that it controls the dimming level of each group of light sources based on the radial distance of the corresponding group from the primary optical axis.

That the dimming level of each group is controlled based on the radial distance of the corresponding group from the primary optical axis has the effect that focus depth and overall light output of the multisource illumination device can be variably controlled independently of each other in wide ranges of the dimming level, provided that at least two groups of light sources are operated, thereby enabling the multisource illumination device to create a high number of new light effects, wherein the electro-optical efficiency can be increased and a multisource illumination device can be built in a more compact and space-saving form.

The controller can be configured to control the multisource illumination device according to the method of one of the methods as described above.

The illumination device controlled by one of the described methods gives light designers new options, wherein they can choose which gate should be in focus and which gate should be not in focus, or if all gates or no gate should be in focus. In other words, the focus depth can be controlled from a low focus depth, wherein substantially only one gate can be in focus to a high focus depth, wherein all gates can be in focus, independently from the overall light output level of the projecting light fixture.

The multisource illumination device can further comprise a projecting system positioned along the primary optical axis, wherein the at least one optical gate can be positioned between the multisource illumination device and the projecting system, and wherein further at least one beam shaping object can be arranged near said at least one optical gate. Therein, the projecting system can be configured to collect a part of the light output generated by the groups of light sources from the at least one optical gate and to project the collected light along the primary optical axis onto a target surface.

The illumination device including a beam shaping device gives light designers even more new light effect options, wherein they can choose which gate or beam shaping device should be in focus and which not, or if all gates or beam shaping objects or none should be in focus.

Each group of light sources can provide substantially the same light distribution at the at least one optical gate.

That each group of light sources provides substantially the same light distribution one optical gate has the effect that the homogeneity in an image projected on a target surface is increased.

Each group of light sources can illuminate the complete area of the at least one optical gate.

That each group of light sources illuminates the complete area of the at least one optical gate increases effect that the edges in an image projected on a target surface are sharp or blurred.

Each group of light sources can illuminate the complete beam shaping object.

That each group illuminates the complete at least one beam shaping object further increases effect that the edges in an image projected on a target surface are sharp or blurred.

DETAILED DESCRIPTION

In the following, concepts in accordance with exemplary embodiments of the invention will be explained in more detail and with reference to the accompanying drawings.

Figure 1:
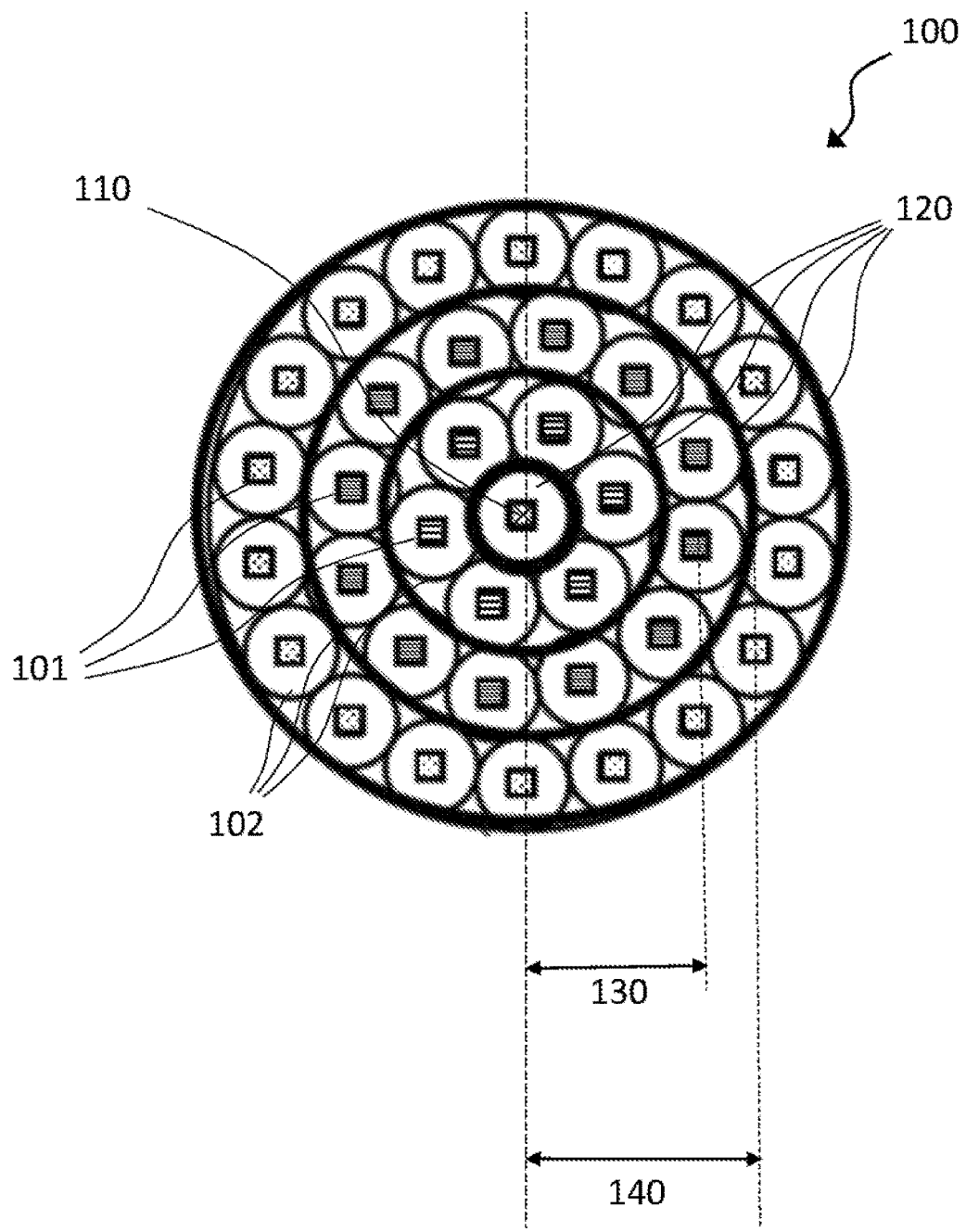
FIG. 1 schematically illustrates a multisource illumination device according to the invention.

FIG. 1 schematically illustrates a multisource illumination device 100 according to the invention.

The multisource illumination device 100 comprises a plurality of light sources 101 with lenslets 102 arranged in a plurality of different groups 120. The light sources 101 are represented by shaded squares, wherein the lenslets 102 are represented by circles around the light sources 101. The primary optical axis 110 is located in the center of the multisource illumination device 100. Each light source 101 is characterized by a radial distance of the light source 130 from the primary optical axis 110. Each group of light sources 120 is characterized by a radial distance of the group 140 from the primary optical axis 110. The radial distance of the group 140 can also comprise a radial distance range from the primary optical axis 110. All light sources 101 in one group of light sources 120 have a radial distance 130 that is within a radial distance range from the primary optical axis 110. Also, the center light source 101, whose center substantially corresponds to the primary optical axis 110, constitutes the group of light sources 120. Therefore, a number of light sources 101 can have different radial distances 130 which lie within the radial distance range. Therein, the light sources 101 of each group of light sources 120 are arranged in a ring shape, wherein the shape can be circular, hexagonal, or any other shape characterized by a dense packaging of the light sources.

Figure 2A:
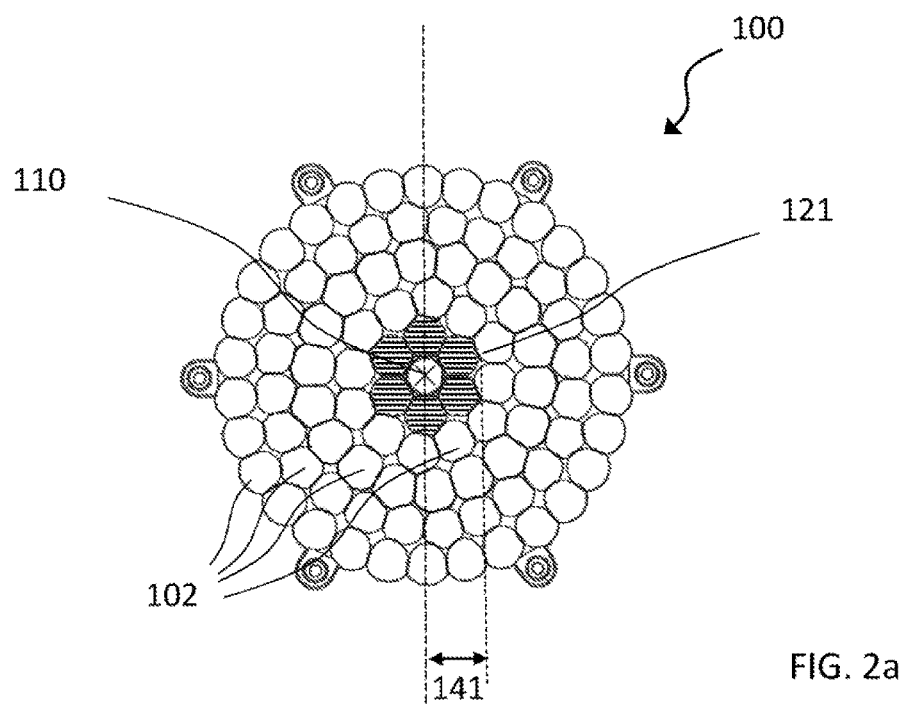
FIG. 2a illustrates a first group of light sources of a multisource illumination device according to the invention.

FIG. 2a illustrates a first group of light sources of a multisource illumination device according to the invention. The multisource illumination device 100 comprises a plurality of light sources 101 and a plurality of lenslets 102. The plurality of lenslets 102 are arranged above the light sources 101 to collect light from the light sources 101 thereby converting the light into a plurality of source light beams 103 (shown in FIG. 2b). The source light beams 103 propagate along an optical axis 110. The lenslets are arranged in a dense pattern, wherein a plurality of groups of light sources and corresponding lenslets are located along circular boundaries, wherein they have the same radial distance to the primary optical axis 110 of the multisource illumination device 100.

Each of the lenslets 102 has a footprint of substantially circular cross section and substantially equal size or footprint-area. The footprint of a lenslet 102 refers to the basic form of the lenslets 102, however the actual shape of the lenslets 102 may deviate from the circular footprint. Further, the lenslets 102 are arranged in a dense circular pattern, i.e., so that a circumscribing circle can be defined which connects with all of the outermost circles or light sources 101 having the same distance 130 to the primary optical axis 110 of the multisource illumination device 100. There may be one lenslet 102 for each light source 101 as shown in FIG. 1 so that there is a one-to-one correspondence between the lenslets 102 and the light sources 101 i.e., so that each light source 101 has an associated lenslet 102. However, one light source 101 may contain one or more light source units possibly integrated into a single light source device such as a 3-in-1 or a 4-in-1 LEDs. As an effect of the dense packing the lenslets 102 may be arranged in a number of rings around the primary optical axis 110.

A first group of light sources 121 is located substantially in the center of the multisource illumination device 100. The primary optical axis 100 is located in the center of the multisource illumination device 100. The first group of light sources 121 is characterized by a radial distance of the first group 141.

Figure 2B:
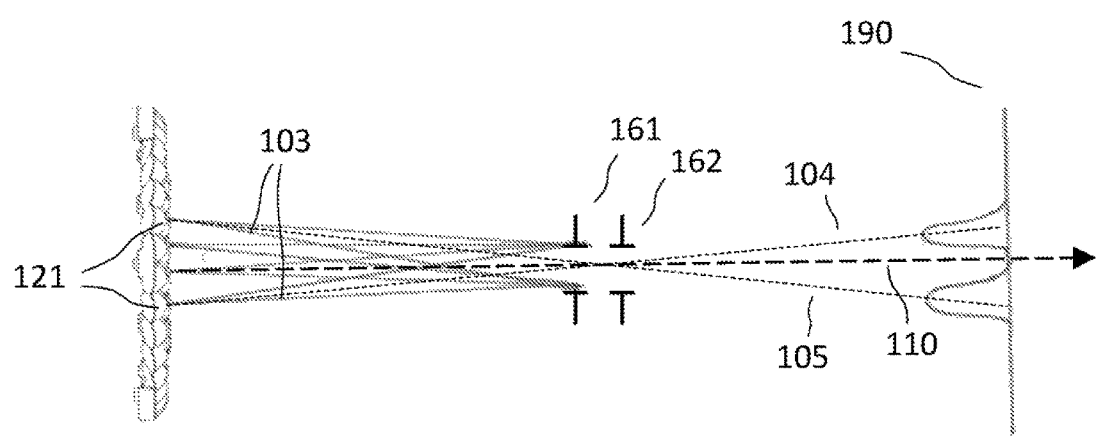
FIG. 2b illustrates a cross-sectional view of the multisource illumination device of FIG. 2a with source light beams.

FIG. 2b illustrates a cross-sectional view of the multisource illumination device of FIG. 2a with source light beams 103. Each lenslet 102 generates the source light beam 103 propagating substantially along the primary optical axis 110. In this embodiment, each source light beam 103 travels at least partly through a first optical gate 161 and a second optical gate 162 and generates a light distribution at a target surface 190, which has a narrow distance between two maximum peaks. In other words, the source light beams 103 of the multisource illumination 100 have a narrow angular distribution.

The source light beams 103 of the first group of light sources 121 therefore generate a light distribution with a high focus depth, as indicated by the two dotted lines 104 and 105 in FIG. 2b, which have a low divergence from the primary optical axis 110.

Figure 3A:
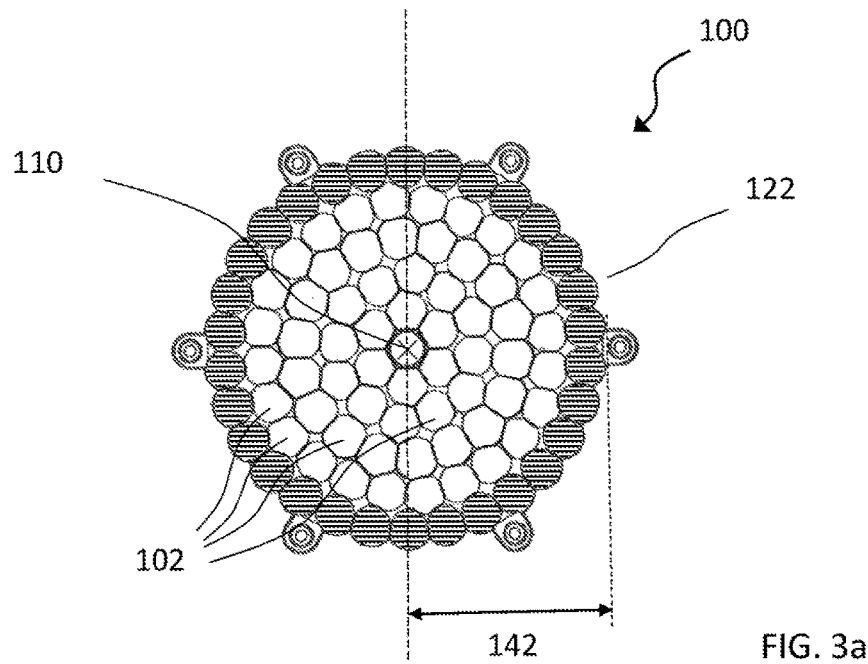
FIG. 3a illustrates a second group of light sources of a multisource illumination device according to the invention.

FIG. 3a illustrates a second group of light sources of a multisource illumination device 100 according to the invention. The multisource illumination device 100 comprises a plurality of light sources with corresponding lenslets 102 arranged above the light sources and a second group of light sources 122 located substantially at a large radial distance 142 from the primary optical axis 110 on the outside of the multisource illumination device 100. The primary optical axis 100 is located in the center of the multisource illumination device 100. The second group of light sources 122 is characterized by a radial distance of the second group 142.

Figure 3B:
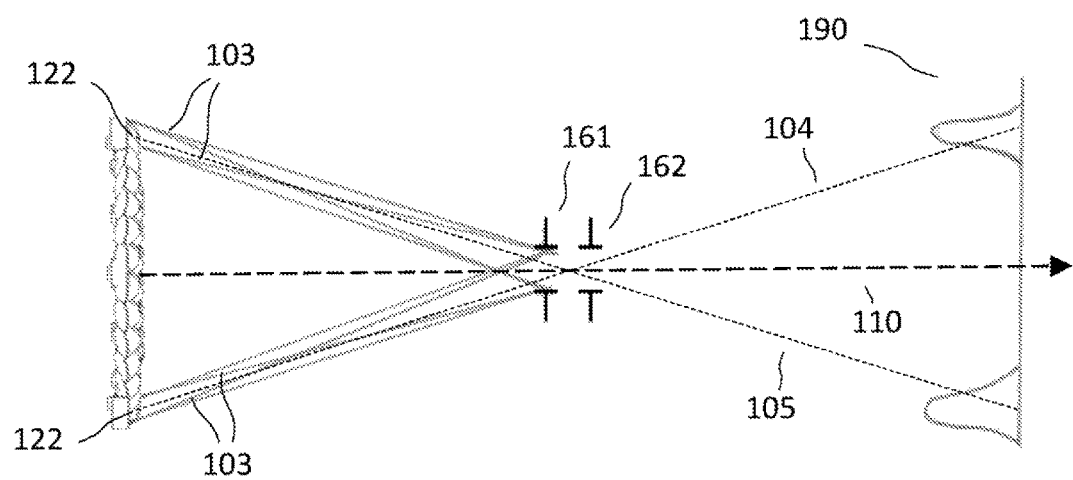
FIG. 3b illustrates a cross-sectional view of the multisource illumination device of FIG. 3a with source light beams.

FIG. 3b illustrates a cross-sectional view of the multisource illumination device of FIG. 3a with source light beams. Each light source generates a source light beam 103 (shown in FIG. 3b) propagating substantially along the primary optical axis 110. In this embodiment, each source light beam 103 travels at least partly through a first optical gate 161 and a second optical gate 162 and generates a light distribution at a target surface 190, which has a great distance between two maximum peaks. In other words, the source light beams 103 of the multisource illumination 100 have a broad angular distribution.

The source light beams 103 of the second group of light sources 122 therefore generate a light distribution with a low focus depth, as indicated by the two dotted lines 104 and 105 in FIG. 3b, which have a high divergence from the primary optical axis 110 compared to FIG. 2b.

It is noted that light beams 103 propagating along the optical axis 110 include rays of light propagating at a relatively small angle of less than 45 degrees to the optical axis 110.

Figure 4:
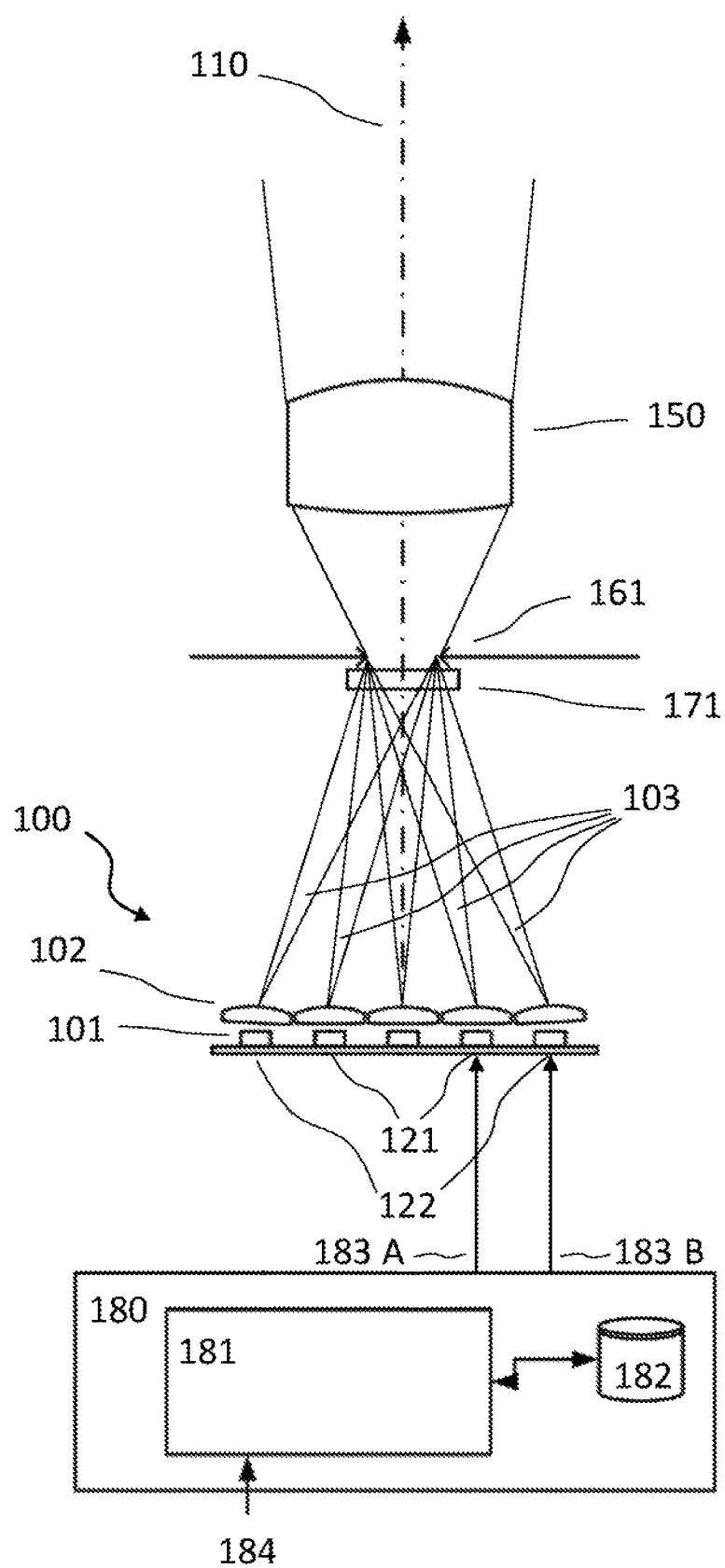
FIG. 4 schematically illustrates a projecting light fixture according to the invention.

FIG. 4 schematically illustrates a projecting light fixture according to the invention, which represents a gated system. In this embodiment of the invention, the projecting light fixture comprises a multisource illumination device 100 including a plurality of light sources 101 and a plurality of optical lenses or lenslets 102 grouped into at least a first group of light sources 121 and a second group of light sources 122. The light sources 101 can be grouped into any number of groups of light sources 120. Each light source 101 generates a source light beam 103 propagating along the primary optical axis 110.

In addition to the optical lenses 102, the multisource illumination device 100 can comprise a plurality of light collectors optically connected to the optical lenses 102. The light collectors can be configured to collect light from the light sources 101 and propagate the light along the optical axis 110. The illustrated embodiment comprises a number of lenslets 102 each collecting light from one of the light sources 101. However, it is noticed that the optical lenses 102 also can be embodied as a single optical lens, a Fresnel lens, a number of TIR lenses (total reflection lenses), a number of light rods etc. or combinations thereof. It is understood that light beams 103 propagating along the optical axis 110 contain rays of light propagating at an angle, e.g., an angle less than 45 degrees to the optical axis 110.

The projecting light fixture further comprises an optical gate 161 and a beam shaping object 171 both arranged between the multisource illumination device 100 and a projecting system 150. The projecting system 150 collects light from the optical gate 161 and projects the collected light along the optical axis 110 towards a target surface (not shown).

Each source light beam 103 travels at least partly through the beam shaping object 171 and an optical gate 161. Therein, in this embodiment, the plurality of source light beams 103 each illuminates the complete opening of the optical gate 161. In other embodiments, source light beams 103 can only illuminates a part of the beam shaping object 171 and the optical gate 161.

In the illustrated embodiment, the light sources 101 are LEDs (light emitting diodes), however the skilled person realizes that any kind of controllable light sources can be used, such as OLED (organic light emitting diodes), PLED (polymer light emitting diodes), discharge lamps, incandescent lamps, plasma lamps.

The projecting light fixture comprises a controller 180 configured to control the first group of light sources 121 and the second group of light sources 122 individually. The controller 180 comprises a processor 181 and a memory 182. The processor 181 is configured to control the first group of light sources 121 and the second group of light sources 122 respectively through communication lines 183 A and 183 B. The processor 181 can thus control one of the groups of light sources 120 without controlling the other group of light sources 120. The processor 181 can, for instance, be adapted to control the absolute light output or the dimming level of a group of light sources 120.

The controller 181 receives input parameters from the communication line 184. The controller 180 can obtain the first and second light source parameters from the memory 182 in form of a preprogrammed pattern/light show. In one embodiment, the controller 180 is configured to receive the first light source parameter and the second light source parameter from an input signal 184 received from an external source. The input signal 184 can be any signal capable of communication of parameters and can for instance be based on one of the following protocols USITT DMX 512, USITT DMX 512 1990, USITT DMX 512-A, DMX-512-A including RDM as covered by ANSI E1.11 and ANSI E1.20 standards, Wireless DMX, Artnet or ACN designates Architecture for Control Networks; ANSI E1.17, E1.31. The light source control parameters can also be generated from user input devices either implemented as a part of the projecting light fixture or implemented on an internal controller which sends the light source control parameter to the projecting light fixture through an input signal. The input parameters on communication lines 183 A and 183 B can be based on any type of communication signals known in the art of lightning e.g. PWM, AM, FM, binary signals, manual input or any other input methods known in the art. It is to be understood that the individual light sources 121 of each group can be controlled by the same control signal, supplied with individual control signals and/or grouped in sub-groups where each subgroup receive the same control signal. The communication lines 183A and 183B are illustrated as individual communication lines to the first group 121 and to the second group 122 of light sources where the controller 180 is configured to generate an activation signal for each light source. However, the skilled person will be able to provide many kind of communication devices between the controller 180 and the light sources 101, for instance, by providing a driver which generates the activation signals for the light sources 101 based on a control signal from the controller 180. Both groups of light sources 101 can be connected to the same data bus and controlled by the controller 180 through a data bus using addressing. In embodiments where the first group 121 and/or the second group 122 of light sources comprise a plurality of light sources 101, it is to be understood that the light sources of each group can be controlled based on the same control signal from the controller 180 or controlled by the same driver.

The controller 180 can be adapted to control the first group 121 and the second group 122 based on, respectively, a first light source control parameter and a second light source control parameter. The first light source control parameter and the second light source control parameter are indicative of at least one parameter defining how the first group and the second group should be controlled. The light source parameter can, for instance, be indicative of intensity/dimming of the light source.

In this embodiment, the controller 180 is configured to control the dimming level of each group 120 in such a way that all light sources of one group have the same light output, and that the dimming level of each group is controlled based on the radial distance of the corresponding group from the primary optical axis 110. The dimming level of each group of light sources 120 can in other embodiments be controlled in such a way that a change of a dimming level of a group of light sources is relative to the radial distance of the group from the primary optical axis 110. The dimming level, or the change of the dimming level, of the group of light sources 120 can directly proportional or, in another embodiment, indirectly proportional to the distance of the group to the primary optical axis 110. In other embodiments, the dimming level, or the change of the dimming level, can be non-linearly dependent on the distance of the group from the primary optical axis, or determined by a focus depth function dependent on the distance of the group from the primary optical axis. Therefore, the focus depth and the light output level of the multisource illumination module 100 can be controlled separately and independently of each other. In other embodiments, the focus depth can be held stable while dimming the overall light output. In even other embodiments, the light output level can be held stable while changing the focus depth of the illumination device.

In other embodiments, the focus depth can be increased while dimming the overall light output, for instance, by dimming the outermost groups of light source first.

In other embodiments, the focus depth can be decreased while increasing the overall light output, for instance, by increasing the light output of the innermost light sources first.

In other embodiments, the focus depth can be decreased while dimming the overall light output, for instance, by dimming the innermost groups of light source first.

In other embodiments, the focus depth can be increased while increasing the overall light output, for instance, by increasing the light output of the outermost light sources first.

Therein, the focus depth can be determined based on the input signal 184 using a predetermined focus depth curve, which shows the direct dependence of the focus depth relative to the input signal 184, or in other embodiments, on a light program mode chosen by a user or light designer.

It is noted that the projecting light fixture also can be integrated as the head of a moving head light fixture comprising a head rotatable connected to a yoke, where the yoke is rotatable connected to a base. The moving head light fixture comprises pan rotating components for rotating the yoke in relation to the base and tilt rotating components for rotating the head in relation to the yoke. The skilled person will realize that the pan and tilt rotating components can be constructed in many different ways using mechanical components such as motors, shafts, gears, cables, chains, transmission systems, bearings etc. In moving head light fixtures, it is possible to arrange the controller 180 and/or the internal power supply in the head, the yoke or in the base.

Figure 5:
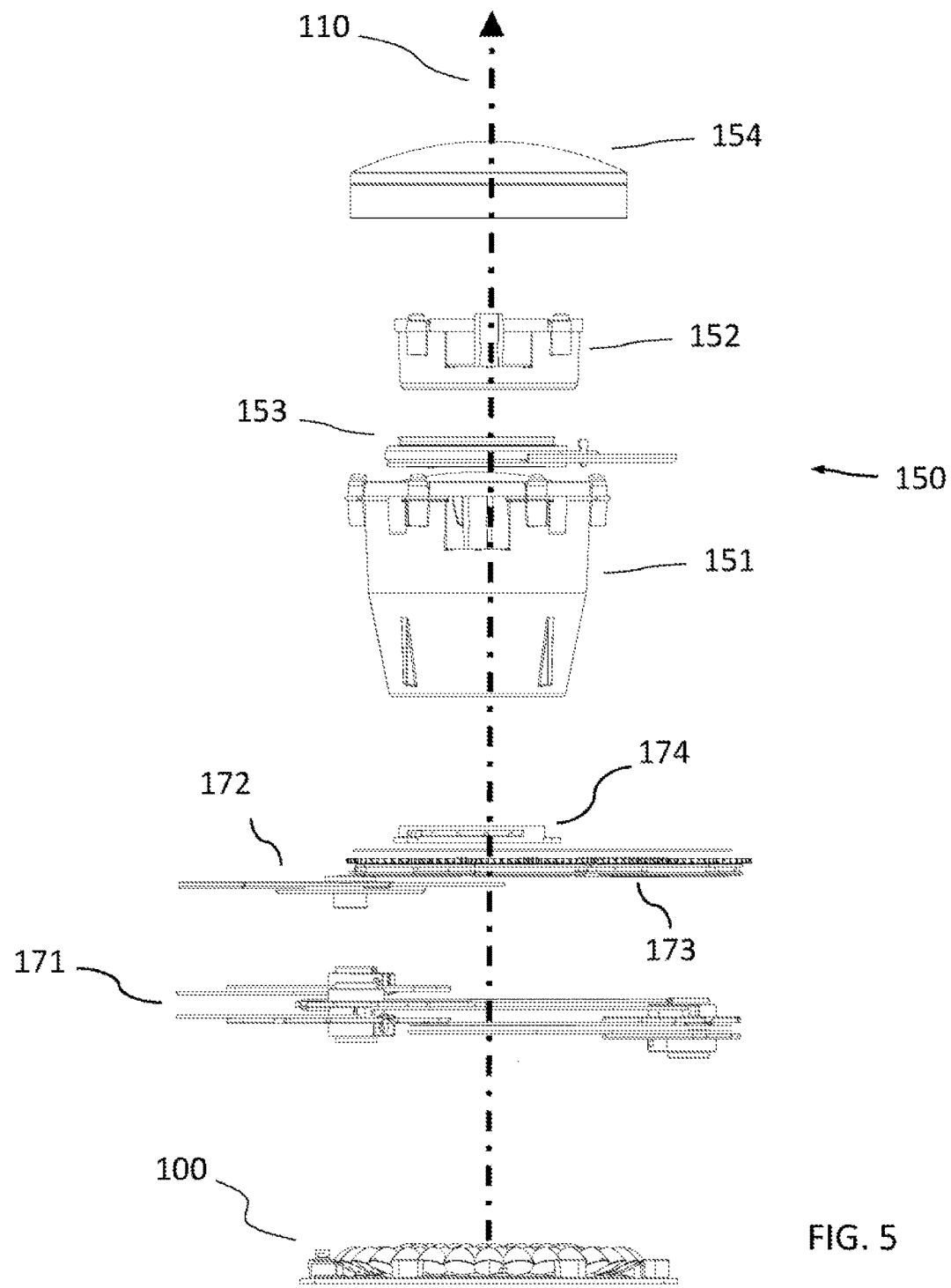
FIG. 5 illustrates a further embodiment of a projecting light fixture according to the invention.

FIG. 5 illustrates a further embodiment of a projecting light fixture according to the invention. A plurality of beam shaping objects is arranged in the optical path of the projecting light fixture, wherein a beam shaping object can comprise a prism object, a rotating or fixed gobo, an animation wheel, a color filter, an iris, a framing module or another beam shaping object known in the art of lighting design. In this embodiment, color filters 171 are arranged between a multisource illumination module 100 and a projecting system 150, wherein the color filters 171 are not arranged in an optical focus of the multisource illumination module 100. Color filters 171 are a CMY color mixing system outside focus in this embodiment. After the color filters 171, a fixed gobo wheel 172 comprising a number of gobos formed in a sheet of metal, rotating gobos 173 and an iris 174 are arranged in the optical path. Any other ordering of the beam shaping objects is possible, in order to create other new light effects by the projecting light fixture.

A projecting system 150 is further arranged along the primary optical axis 110. The projecting system comprises a focus group 151, a prism object 153, a zoom group 152 and a front lens 154. Therein, the focus group 151 is configured to collect light modified by the beam shaping objects 171 to 174 and project the light along the primary optical axis 110. In this embodiment, the projecting system 150 further comprises a prism object 153 which can be moved in and out of the light beam in order to apply prism effects to the light beam. The optical zoom group 152 can be moved along the optical axis 110 in order to create a zoom effect to the light beam. As described previously, the projecting system 150 is configured to collect at least a part of the light beams transmitted through the beam shaping objects 171 to 174 and to project the light along the primary optical axis 110 onto a target surface such as a screen, for example, a screen or an area on a concert stage. Beam shaping objects 171 to 174 may comprise some opaque pattern provided on a transparent window, an open pattern in a non-transparent material, known in the field of entertainment lighting, so that the illuminated image can be imaged by the optical projecting system 150.

The projecting light fixture illustrated in FIG. 5 is controlled by a controller 180 (not shown in FIG. 5) similar to the one described in connection with FIG. 4. The controller 180 is configured in such a way, that the controller 180 controls focus depth and light output of the multisource illumination device 100 independently of each other. In this manner, the controller 180 can, for example, control the multisource illumination device 100 in such a way, that the beam shaping objects 171 to 174 are in or out of the focus of source light beams 103 generated by the multisource illumination device 100, or that all beam shaping objects 171 to 174 or none of the beam shaping objects are in focus, independently of the light output of multisource illumination device 100.

Figure 6:
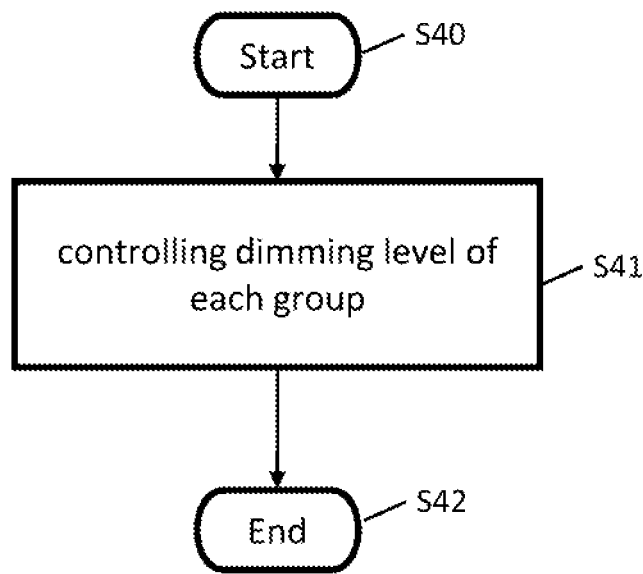
FIG. 6 illustrates a flow chart of a method for controlling a multisource illumination device according to the invention.

FIG. 6 illustrates a flow chart of the method for controlling a multisource illumination device according to the invention. The process starts with step S40. In step S41 one the dimming level of each group of light sources 120 of the multisource illumination module 100 is controlled based on the radial distance 140 of the corresponding group 120 from the primary optical axis 110. The process ends with step S42.

Figure 7:
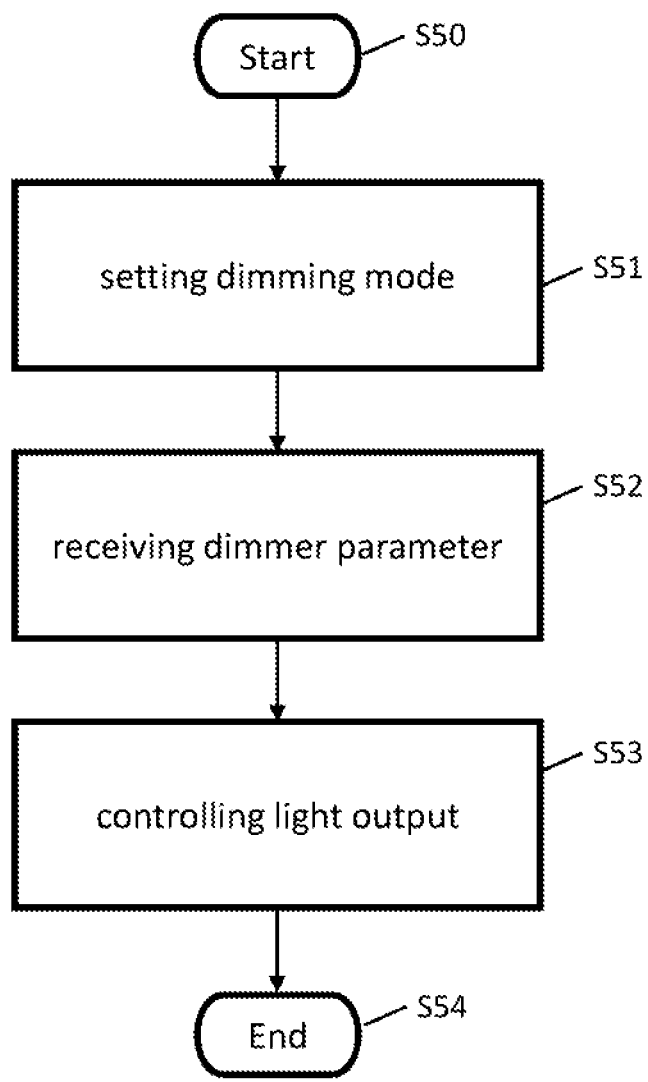
FIG. 7 illustrates a flow chart of a method for controlling a multisource illumination device.

FIG. 7 illustrates a flow chart of a method for controlling a multisource illumination device 100. The method starts with step S50. In step S51, a dimming mode is set. In an embodiment, the dimming mode can represent increasing the depth of focus or decreasing the depth of focus. Further in step S52, a dimmer parameter is received, which is indicative of the overall dimming level of all light sources 101. In step S53, a light output of groups of light sources 120 is dimmed based on the dimmer parameter and dimming mode. The method ends with step S54.

Figure 8:
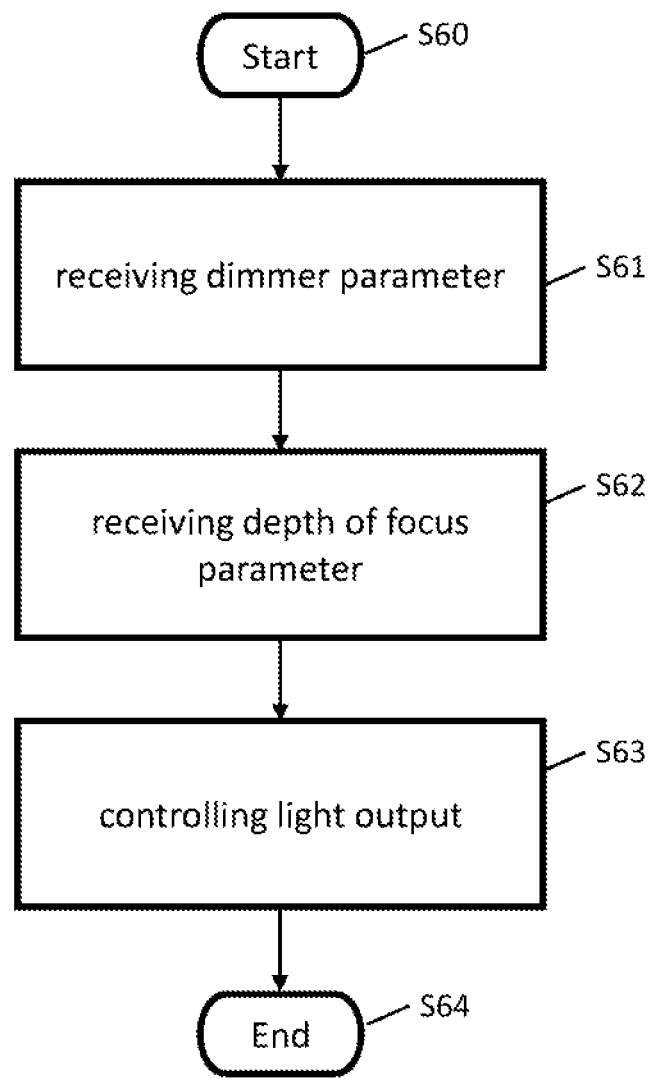
FIG. 8 illustrates a flow chart of a method for controlling a multisource illumination device.

FIG. 8 illustrates a flow chart of a method for controlling a multisource illumination device 100. The method starts with Step S60. In step S61, a dimmer parameter indicative of overall dimming level is received. In step S62, a depth of focus parameter indicative of depth of focus is received. In step S63, a light output of groups of light sources is controlled based on dimmer parameter and depth of focus parameter by maintaining the overall light output but by varying light output of different groups in relation to each other. In particular, in a dimming level range from 30% to 70%, especially at around 50% dimming level, the depth of focus can be varied the most and the depth of focus variation range decrease as the overall dimming level approaches 100% and 0%.

Summarizing, a method for controlling a multisource illumination device 100 in gate optical system is provided. The plurality of light sources 101 is divided into a plurality of groups 120, and wherein each group is characterized by a respective radial distance 140 from a primary optical axis 110. Therein, the dimming level of each group 120 is controlled independently from the dimming level of the other groups based on the radial distance 140 of the group 120 from the primary optical axis 110.

The method for controlling a multisource illumination device 100 according to the invention provides a variable F-Number of the multisource illumination device, wherein focus depth and overall light output of the multisource illumination module 100 can be changed independently from each other. The multisource illumination device is thereby capable of creating a high number of new light effects, which can be variably and independently controlled in lighting applications.

LIST OF REFERENCE SIGNS

100 multisource illumination device
101 light sources
102 lenslets
103 source light beam
110 primary optical axis
120 groups of light sources 121 first group of light sources
122 second group of light sources
130 radial distance of a light source
140 radial distance of a group
141 radial distance of a first group
142 radial distance of a second group
150 projecting system
151 optical zoom group
152 optical focus group
153 prism object
154 front lens
161 optical gate
162 second optical gate
171 color filters
172 fixed gobo wheel
173 rotating gobos
174 iris
180 controller
181 processor
182 memory
183 A communication line
183 B communication line
184 input signal
190 light distribution at target surface
S40 Start
S41 controlling dimming level of each group
S46 End
S50 Start
S51 setting dimming mode
S52 receiving dimmer parameter
S53 controlling light output
S54 End
S60 Start
S61 receiving dimmer parameter
S62 receiving depth of focus parameter
S63 controlling light output
S64 End

What is claimed is:

1. A method for controlling a multisource illumination device, which comprises a plurality of light sources, wherein each light source generates a source light beam propagating at least partially along a primary optical axis of the multisource illumination device, wherein the plurality of light sources is divided into a plurality of groups based on a radial distance of each light source from the primary optical axis, wherein each group is located at a respective radial distance from the primary optical axis, wherein the radial distance of each group is different from the radial distances of the other groups, the method comprising:
   controlling a dimming level of each group independently from the dimming level of the other groups; and
   controlling the dimming level of each group in such a way that all of the plurality of light sources of one group have a same light output, wherein the light output is at least partly directed towards an optical gate, and wherein a dimming level of a group of light sources is correlated to the radial distance of the group of light sources from the primary optical axis.

2. The method of claim 1, wherein the dimming level of each group of light sources is controlled in such a way that the dimming level of each group of light sources is correlated to the radial distance of the corresponding group of light sources from the primary optical axis.

3. The method of claim 1, wherein the dimming level of the groups of light sources is decreased in dependence on the radial distance of the corresponding group of light sources, wherein the decrease of the dimming level is larger the further away the corresponding group of light sources is located from the primary optical axis.

4. The method of claim 3, wherein the dimming level of each group is decreased to zero percent before the dimming level of a next group is decreased.

5. The method of claim 1, wherein the dimming level of the groups of light sources is decreased in dependence on the radial distance of the group of light sources, wherein the decrease of the dimming level is larger the closer the corresponding group of light sources is located to the primary optical axis.

6. The method of claim 1, wherein the dimming level of the groups of light sources is increased in dependence on the radial distance of the group of light sources, wherein the increase of the dimming level is larger the closer the corresponding group is located to the primary optical axis.

7. The method of claim 6, wherein the dimming level of each group is increased to one hundred percent before the dimming level of a next group of light sources is increased.

8. The method of claim 1, wherein the dimming level of the groups of light sources is increased in dependence on the radial distance of the group of light sources, wherein the increase of the dimming level is larger the further away the corresponding group is located from the primary optical axis.

9. The method of claim 1, wherein the dimming level of each group is controlled in such a way, that a focus depth of the multisource illumination device remains the same and an overall light output of all groups of light sources is changed, by changing the dimming level in dependence on the radial distance to the primary optical axis.

10. The method of claim 9, wherein the dimming level of each group is controlled in such a way, that an overall light output of the groups of light sources remains the same and a focus depth of the multisource illumination device is changed, by changing the dimming level in dependence on the radial distance to the primary optical axis.

11. The method of claim 1, wherein the dimming level of each group is controlled in such a way, that an overall light output of the groups of light sources is changed and at a same time, a focus depth of the multisource illumination device is changed, by changing the dimming level in dependence on the radial distance to the primary optical axis.

12. A multisource illumination device including a controller that is configured to control the multisource illumination device according to the method of claim 1.

13. A multisource illumination device comprising:
   a plurality of light sources, wherein each light source generates a source light beam propagating at least partially along a primary optical axis of the multisource illumination device, wherein the plurality of light sources are divided into a plurality of groups based on a radial distance of each light source from the primary optical axis, wherein each group is located at a respective radial distance from the primary optical axis, wherein the radial distance of each group is different from the radial distances of the other groups;
   a controller configured to control a dimming level of each group independently from dimming levels of the other groups and configured to control the dimming level of each group in so that all light sources of one group have the same light output; and
   at least one optical gate;
   wherein the controller is configured to control the dimming level of each group of the light sources based on the radial distance of the corresponding group from the primary optical axis.

14. The multisource illumination device of claim 13 further comprising a projecting system positioned along the primary optical axis;
- wherein the at least one optical gate is positioned between the multisource illumination device and the projecting system,
- wherein at least one beam shaping object is arranged near the at least one optical gate, wherein the projecting system is configured to collect a part of a light output generated by the groups of light sources from the at least one optical gate, and
- wherein the projecting system is configured to project the collected portion of the light output along the primary optical axis onto a target surface.

15. The multisource illumination device of claim 13, wherein each group of light sources provides the same light distribution at the at least one optical gate.

16. A multisource illumination device comprising:
- a plurality of light sources, wherein each light source generates a source light beam propagating at least partially along a primary optical axis of the multisource illumination device, wherein the plurality of light sources are divided into a plurality of groups based on a radial distance of each light source from the primary optical axis, wherein each group is located at a respective radial distance from the primary optical axis, wherein the radial distance of each group is different from the radial distances of the other groups; and
- a controller configured to control a dimming level of each group independently from the dimming levels of the other groups and configured to control the dimming level of each group in such a way that all light sources of one group have the same light output;
- wherein the controller is configured to control the dimming level of each group of the light sources based on the radial distance of the corresponding group from the primary optical axis.

17. The multisource illumination device of claim 16 further comprising a projecting system positioned along the primary optical axis and at least one optical gate;
- wherein the at least one optical gate is positioned between the multisource illumination device and the projecting system,
- wherein at least one beam shaping object is arranged near the at least one optical gate, wherein the projecting system is configured to collect a part of a light output generated by the groups of light sources from the at least one optical gate, and
- wherein the projecting system is configured to project the collected portion of the light output along the primary optical axis onto a target surface.

18. The multisource illumination device of claim 16, wherein each group of light sources provides substantially the same light distribution at at least one optical gate.

19. The multisource illumination device of claim 16, wherein the controller is further configured to control the dimming level of each group of light sources so that the dimming level of each group of light sources is correlated to the radial distance of the corresponding group of light sources from the primary optical axis.

20. The multisource illumination device of claim 16, wherein the controller is further configured to decrease the dimming level of the groups of light sources in dependence on the radial distance of the corresponding group of light sources, wherein the decrease of the dimming level is larger the further away the corresponding group of light sources is located from the primary optical axis.

* * * * *